United States Patent
Kalgaonkar et al.

(10) Patent No.: US 12,359,112 B2
(45) Date of Patent: Jul. 15, 2025

(54) NANOSILICA-BASED COMPOSITIONS AND RELATED METHODS FOR PROVIDING WATER SHUT OFF TO SUBTERRANEAN FORMATIONS

(71) Applicant: SAUDI ARABIAN OIL COMPANY, Dhahran (SA)

(72) Inventors: Rajendra Arunkumar Kalgaonkar, Dhahran (SA); Qasim Abdullah Sahu, Muntazah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1 day.

(21) Appl. No.: 18/337,358

(22) Filed: Jun. 19, 2023

(65) Prior Publication Data
US 2024/0417617 A1   Dec. 19, 2024

(51) Int. Cl.
   E21B 33/138   (2006.01)
   C09K 8/516   (2006.01)

(52) U.S. Cl.
   CPC .......... C09K 8/516 (2013.01); E21B 33/138 (2013.01); *C09K 2208/10* (2013.01)

(58) Field of Classification Search
   CPC .... C09K 8/516; C09K 2208/10; E21B 33/138
   See application file for complete search history.

(56) References Cited

U.S. PATENT DOCUMENTS

| | | | |
|---|---|---|---|
| 5,320,171 A | 6/1994 | Laramay | |
| 7,013,973 B2 | 3/2006 | Danican et al. | |
| 7,458,424 B2 | 12/2008 | Odeh et al. | |
| 7,934,557 B2 | 5/2011 | Nguyen | |
| 7,954,549 B2 | 6/2011 | Lende et al. | |
| 9,045,965 B2 | 6/2015 | Patil et al. | |
| 9,133,386 B2 | 9/2015 | Kumar et al. | |
| 10,954,427 B2 | 3/2021 | Kalgaonkar et al. | |
| 2010/0131041 A1* | 5/2010 | Lewis | A61F 2/82 623/1.13 |
| 2011/0094746 A1 | 4/2011 | Allison et al. | |
| 2013/0284518 A1* | 10/2013 | Wu | C09K 8/035 175/65 |
| 2014/0231082 A1* | 8/2014 | Jamison | C09K 8/50 166/308.1 |
| 2017/0198191 A1* | 7/2017 | Potapenko | C09K 8/516 |
| 2019/0055456 A1* | 2/2019 | Wagle | C09K 8/5045 |
| 2019/0352556 A1* | 11/2019 | Kalgaonkar | C09K 8/5755 |
| 2022/0389305 A1* | 12/2022 | Zakaria | C09K 8/572 |

FOREIGN PATENT DOCUMENTS

| | | |
|---|---|---|
| CN | 101875765 A | 11/2010 |
| CN | 104962052 A | 10/2015 |
| CN | 105295321 A | 2/2016 |
| CN | 108384520 B | 8/2018 |
| CN | 112745819 A | 5/2021 |
| CN | 112795373 A | 5/2021 |

\* cited by examiner

*Primary Examiner* — Silvana C Runyan
(74) *Attorney, Agent, or Firm* — Vorys, Sater, Seymour and Pease LLP

(57) ABSTRACT

Compositions and methods for providing water shut off within a water producing zone of a wellbore. The composition includes alkaline nanosilica particles and hydrolysable ester-based 3D engineered non-convex particles. The method includes dissolving the hydrolysable ester-based 3D engineered non-convex particles to release an acid, which reacts with the alkaline nanosilica particles to form a solid.

9 Claims, 4 Drawing Sheets

NANOSILICA-BASED COMPOSITIONS AND RELATED METHODS FOR PROVIDING WATER SHUT OFF TO SUBTERRANEAN FORMATIONS

FIELD OF INVENTION

The present disclosure relates generally to methods and systems for use in the oil and gas industry, and more particularly, to compositions for limiting coproduced water in oil and gas wellbores and methods and systems related thereto.

BACKGROUND

The production of crude oil and other hydrocarbons starts with the drilling of a wellbore into a hydrocarbon reservoir. In many cases, the hydrocarbon reservoir is a narrow layer of material in the subterranean environment, wherein other layers have high water content. Indeed, it is believed that most hydrocarbon-bearing subterranean formations were completely or substantially completely saturated with water prior to drilling and tapping into hydrocarbons. Thus, hydrocarbon reservoirs typically contain both petroleum hydrocarbons (liquid and gas) and water. Sources of water in a hydrocarbon reservoir may include flow from above or below the hydrocarbon zone, flow from within the hydrocarbon zone, or flow from injected fluids or other additives as a result of activities such as drilling, completion, and/or production.

As a well is produced, previously productive hydrocarbon-bearing layers may start producing higher amounts of water. Excessive water production greatly affects the economic life of producing wells and is also responsible for many damage mechanisms related to oilfield equipment, such as scale deposition, fines migration, asphaltene precipitation, and corrosion. Such excessive water production can lead to increased operating costs to separate, treat, and dispose of the produced water in accordance with applicable environmental regulations.

Available strategies have been employed to mitigate the incursion of water into hydrocarbon producing wellbores. These strategies involve mechanical or chemical "shut off" techniques designed to block water-bearing channels, fractures, or vugular ("vug") zones. As used herein, the terms "water shut off" or "shut off," and grammatical variants thereof, refers to the mitigation or compete prevention of unwanted water production within a wellbore. Mechanical shut off techniques include installation of straddle packers, bridge plugs, casing patches, cement plugs, and the like. Such mechanical shut off techniques can, among other things, physically restrict flow within the wellbore and prevent certain treatment operations (e.g., perforation and isolation). Chemical shut off techniques typically involve introduction of gel-based fluids (e.g., polyacrylamide gels) into the pore matrix of a formation to prevent water seepage. However, such chemical shut off materials are often unusable in certain geographical regions, particularly those with strict environmental regulations.

In view of the above, it is desirable to have an improved shut off technique to control unwanted water incursion into a hydrocarbon-bearing wellbore.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In one or more aspects, the present disclosure provides a water shut off composition including alkaline nanosilica particles; and hydrolysable ester-based 3D engineered non-convex particles.

In another aspect, the present disclosure provides a method including introducing a water shut off composition into a water producing zone in a wellbore, the water shut off composition comprising alkaline nanosilica particles and hydrolysable ester-based 3D engineered non-convex particles; degrading the hydrolysable ester-based 3D engineered non-convex particles to release an acid within the water producing zone in the wellbore; and reacting the acid and the alkaline nanosilica particles, thereby forming a solid within the water producing zone in the wellbore.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
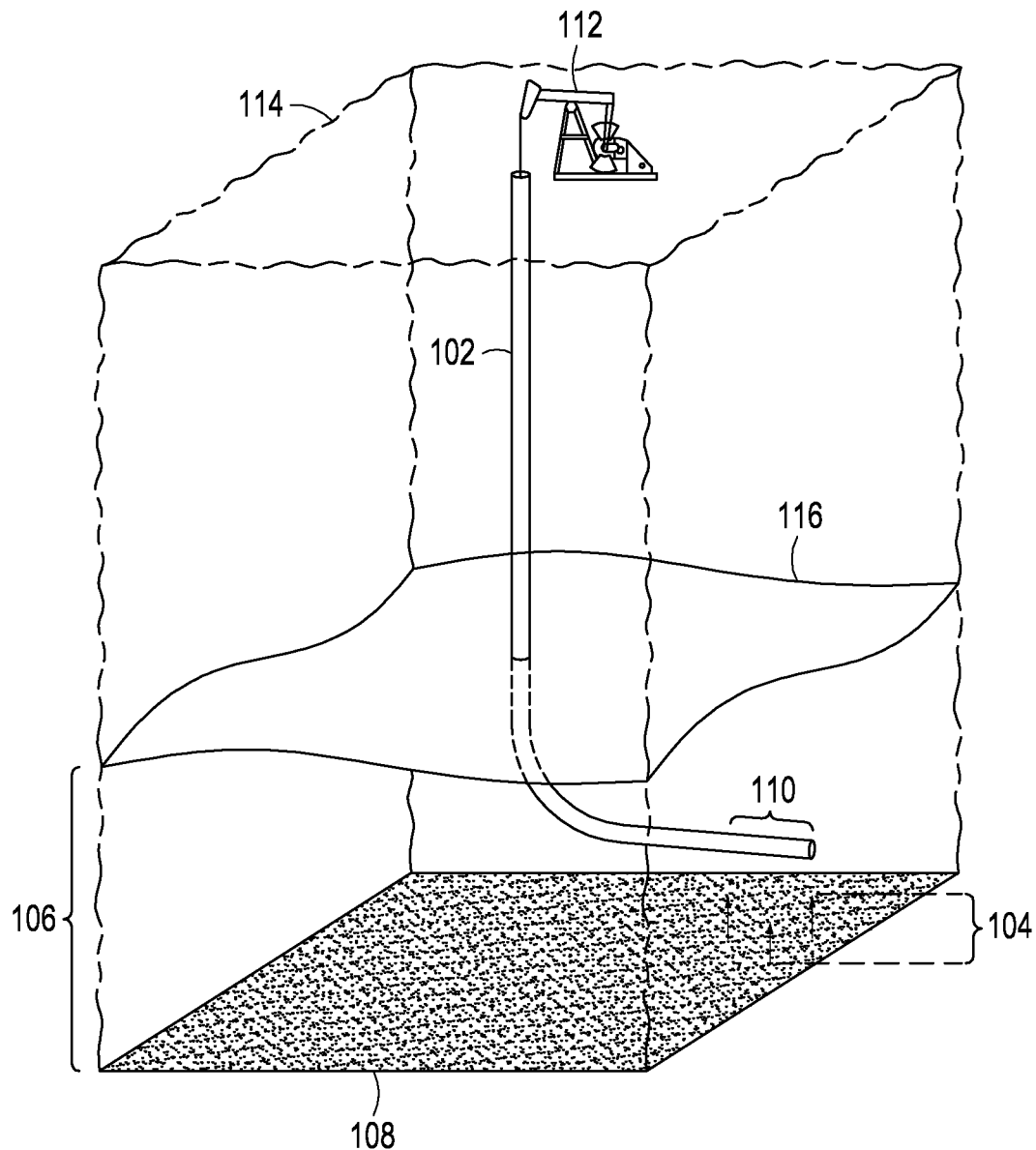
FIG. 1 is a schematic drawing of a wellbore, showing increased production of water in a reservoir layer in a subterranean formation.

The present disclosure relates generally to methods and systems for use in the oil and gas industry, and more particularly, to compositions for limiting coproduced water in oil and gas wellbores and methods and systems related thereto.

The present disclosure provides a chemical shut off solution for plugging and scaling water producing zones within a wellbore. It is to be appreciated that while the subsequent disclosure describes the chemical shut off solution with reference to plugging and sealing water producing zones, it is equally applicable to gas producing zones, without departing from the scope of the present disclosure. It is further to be noted that while the subsequent disclosure describes the chemical shut off solution of the present disclosure with reference to shut off operations, the chemical shut off solution is equally applicable controlling lost circulation during wellbore drilling operations, without departing from the scope of the present disclosure.

In particular, embodiments of the present disclosure include nanosilica-based colloidal mixtures (NSCMs) that provide delayed water shut off due to their delayed gelation in the presence of an activator. As used herein, the term "delayed water shut off," and grammatical variants thereof, refers to a water shut off composition that reaches full functionality (i.e., gels and solidifies) over a period of time. The NSCMs of the present disclosure may be delayed for a period of time in the range of about 1 hour to about 24 hours, encompassing any value and subset therebetween, such as about 1 hour to about 5 hours, or about 5 hours to about 10 hours, or about 10 hours to about 15 hours, or about 15 hours to about 20 hours, or about 5 hours to about 15 hours, or about 5 hours to about 24 hours.

The NSCMs described herein comprise alkaline nanosilica particles in combination with hydrolysable ester-based 3D engineered non-convex particles (3DP) that act as an acid precursor (activator) for the alkaline nanosilica particles. The 3DP acid precursors of the present disclosure operate to delay gelation of the alkaline nanosilica particles. The 3DP acid precursors can be placed downhole where they operate as a bridging agent to prevent initial fluid losses into fractures/vugular producing water zones prior to the gelation of the nanosilica particles. The ester of the 3DP acid precursors hydrolyzes in water and generates acid, which destabilizes the nanosilica particles, resulting in a delayed gelled solid.

Embodiments of the present disclosure will now be described in detail with reference to the accompanying Figures. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

FIG. 1 is a schematic drawing of a wellbore 102, showing increased production of water 104 in a reservoir layer 106 in a subterranean formation. The water 104 may come from an underlying water table, or water layer 108, below the reservoir layer 106. A section 110 of the wellbore 102 closest to the water layer 108 may draw water 104 into the wellbore 102 during the pumping cycle of a pump jack 112, for example, at the surface 114, thereby increasing the amount of produced water.

In other circumstances, a continuous production from the reservoir layer 106 to the surface 114 may entrain water 104 from the water layer 108, increasing the amount of water 104 produced from the section 110 of the wellbore. Further, as the reservoir layer 106 is produced, the amount of hydrocarbons between the water layer 108 and a cap rock layer 116 decreases, which may allow the water layer 108 to draw closer to the cap rock layer 116, moving closer to the section 110 of the wellbore 102. This may also increase the amount of water 104 produced.

In various embodiments described herein, the NSCMs may be used to form a gel, blocking production from the section 110 of the wellbore 102. In various embodiments, The NSCMs are injected into the wellbore 102 to the section 110 to be shut off. The NSCMs may be pushed into the section 110, for example, through perforations in the production tubing. The 3DP acid precursors will then cause gelation of the nanosilica particles.

Figure 2:
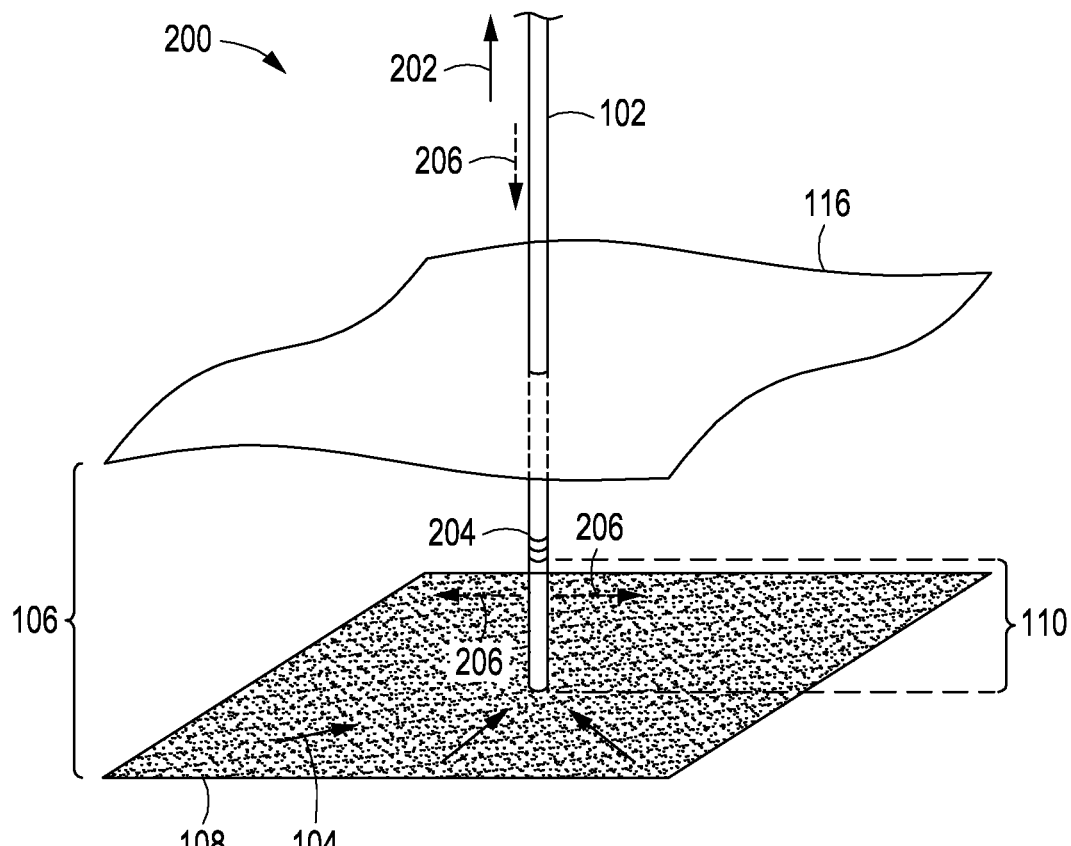
FIG. 2 is a schematic drawing of a method of sealing a section of a wellbore to decrease coproduction of water.

FIG. 2 is a schematic drawing of a method 200 of sealing a section 110 of a wellbore 102 to decrease coproduction of water 104 using the NSCMs of the present disclosure. Like numbered items are as described with respect to FIG. 1. In the example shown in FIG. 2, the wellbore 102 is shown as vertical. However, as shown in the example of FIG. 1, the wellbore can be directionally drilled into the reservoir layer 106 or otherwise deviated.

The method 200 begins when the produced fluids 202 include an unacceptable amount of water 104, for example, coproduced from a water layer 108. Such unacceptable water may be greater than about 1 vol % of the produced fluids 202, greater than about 25 vol % of the produced fluids 202, or in the range of about 1 vol % to about 50 vol % of the produced fluids 202, encompassing any value and subset therebetween. The section 110 of the wellbore 102 closest to the water layer 108 may be responsible for the majority of the water 104 that is coproduced. Accordingly, sealing off this section 110 will lower the amount of water 104 in the produced fluids 202.

A zonal isolation tool, such as a packer 204, may be placed in the wellbore 102 to isolate the section 110 responsible for the majority of the production of the water 104. Once the packer 204 is in place, the NSCMs 206 may be injected into the wellbore 102, for example, through a coil tubing line to the section 110 that is being sealed off. The NSCMs 206 may be forced through the section 110 of the wellbore 102 and into the portion of the reservoir layer 106 surrounding the section 110.

The 3DP acid precursor initiates the gelling of the nanosilica particles. The formation of the gel then seals the section 110 of the wellbore 102 and the associated region of the reservoir layer 106, decreasing or eliminating the coproduction of water 104.

Once the gelation is completed, the packer 204 may be removed from the wellbore 102. Production is restarted and the amount of water in the produced fluids 202 is determined to ensure that the sealing of the section 110 was successful.

The use of the gel for shutting off regions that are producing water allows for a simpler solution than leaving packers or other zonal isolation devices in the well for long periods of time. Further, sealing of the reservoir layer 106 associated with the section 110 of the wellbore 102 allows for continuing production of lower zones without placing restrictions due to zonal isolation devices in the wellbore 102.

The alkaline nanosilica particles forming a portion of the NSCMs of the present disclosure may include crystalline silica, amorphous silica, and any combination thereof. Such nanosilica particles may include, but are not limited to, sodium silicate, silicon dioxide, and the like, and any combination thereof.

In some embodiments, the nanosilica particles have an average particle diameter ranging from about 2 nm to about 150 nm, such as from about 3 nm to about 50 nm, or from about 5 nm to about 25 nm. In some embodiments, the average particle diameter is in the range of from about 6 nm to about 20 nm.

In some embodiments, the nanosilica particles have a specific surface area from about 20 $m^2\ g^{-1}$ to about 1500 $m^2\ g^{-1}$, such as from about 50 $m^2\ g^{-1}$ to about 900 $m^2\ g^{-1}$, from about 70 $m^2\ g^{-1}$ to about 600 $m^2\ g^{-1}$, or from about 70 $m^2\ g^{-1}$ to about 400 $m^2\ g^{-1}$, or about 160 $m^2\ g^{-1}$. The term "specific surface area," as used herein, and grammatical variants thereof, refers to the surface area of a solid particle divided by the mass of the solid particle.

The 3DP acid precursors are engineered to have a non-convex morphology, which can be placed into a wellbore as a single pill with the nanoparticles described herein, thus forming the NSCMs. The 3DP acid precursors are composed of hydrolysable esters (e.g., polyesters) or imides (e.g., polyimides). Specific examples of compositions for the 3DP acid precursors include, but are not limited to, polylactic acid (PLA), polyglycolic acid (PGA), and any combination thereof. Such 3DP acid precursors degrade over time within the wellbore into an acid, thus destabilizing the nanosilica particles and resulting in a gelled solid to effectuate water shut off. The rate of degradation of the 3DP acid precursors will govern the gelling time of the nanosilica particles.

Figure 3:
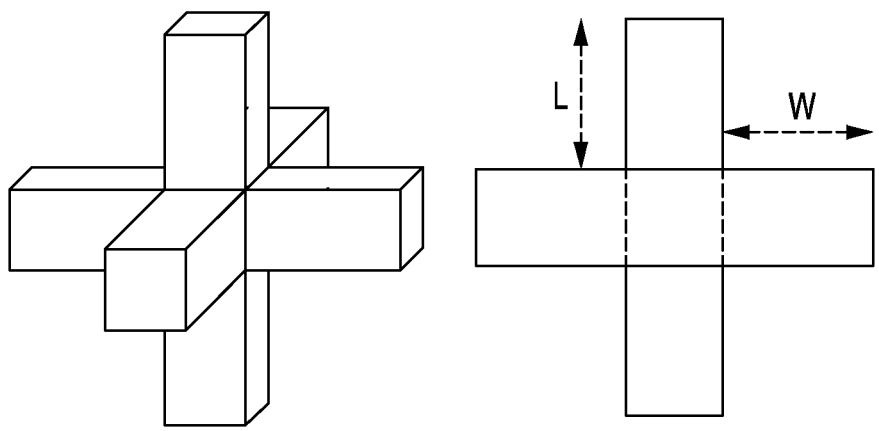
FIG. 3 is a schematic drawing of the hydrolysable ester-based 3D engineered non-convex particles of the present disclosure.

Referring now to FIG. 3, illustrated is a schematic drawing of the geometry of the 3DP acid precursors of the present disclosure. As shown, the 3DP acid precursors may be cross shaped, wherein the size is less than the particular fracture/vug to be sealed. In some embodiments, the length and width of the 3DP acid precursors may be in the range of about 0.05 inches to about 0.3 inches, encompassing any value and subset therebetween, such as about 0.05 inches to about 0.1 inches, or about 0.1 inches to about 0.2 inches, or about 0.2 inches to about 0.3 inches.

Figure 4:
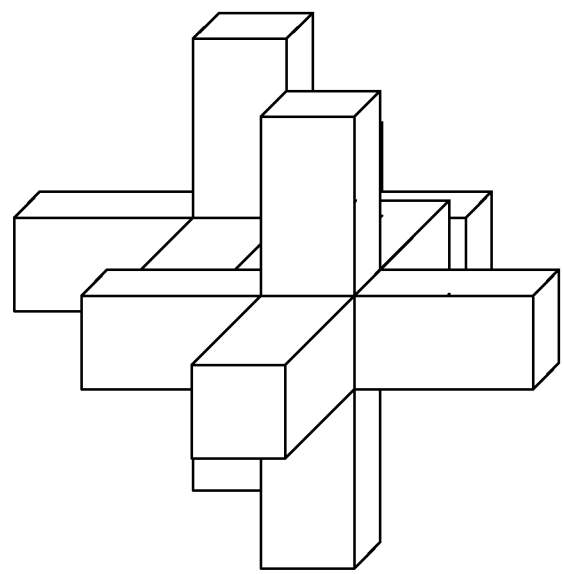
FIG. 4 is a schematic drawing of interlocked hydrolysable ester-based 3D engineered non-convex particles of the present disclosure.

Advantageously, and as depicted in FIG. 4, the cross shaped 3DP acid precursors are able to interact and interlock to improve the water shut off capability of the NSCMs described herein. Accordingly, they are of a size for pumping into a wellbore but become much larger as a collective upon interlocking to aid in water shut off. Moreover, the delayed nature of the 3DP acid precursors enables the nanosilica particles to be precisely placed before gelation, thus avoiding plugging of pipe lines, coiled tubing, or other tubulars.

The density of the 3DP acid precursors may be in the range of about 1.2 g/cm$^3$ to about 1.6 g/cm$^3$, encompassing any value and subset therebetween, such as about 1.2 g/cm$^3$ to about 1.3 g/cm$^3$, or about 1.3 g/cm$^3$ to about 1.4 g/cm$^3$, or about 1.4 g/cm$^3$ to about 1.5 g/cm$^3$, or about 1.5 g/cm$^3$ to about 1.6 g/cm$^3$. For example, the density of PLA is in the range of about 1.21 g/cm$^3$ to about 1.25 g/cm$^3$ and the density of PGA is about 1.53 g/cm$^3$.

The tensile strength of the 3D acid precursors may be in the range of about 20 MPa to about 60 MPa, encompassing any value and subset therebetween, such as about 20 MPa to about 30 MPa, or about 30 MPa to about 40 MPa, or about 40 MPa to about 50 MPa, or about 50 MPa to about 60 MPa. For example, the tensile strength of PLA is in the range of about 21 MPa to about 60 MPa and the tensile strength of PGA is about 60 MPa.

The elastic modulus of the 3D acid precursors may be in the range of about 0.35 MPa to about 6000 MPa, encompassing any value and subset therebetween, such as about 0.35 MPa to about 5 MPa, or about 5 MPa to about 100 MPa, or about 100 MPa to about 1000 MPa, or about 1000 MPa to about 3000 MPa, or about 3000 MPa to about 6000 MPa. For example, the elastic modulus of PLA is in the range of about 0.35 MPa to about 0.5 MPa and the elastic modulus of PGA is about 6000 MPa.

The melting temperature of the 3D acid precursors may be in the range of about 150° C. to about 230° C., encompassing any value and subset therebetween, such as about 150° C. to about 175° C., or about 175° C. to about 200° C., or about 200° C. to about 230° C. For example, the melting temperature of PLA is in the range of about 150° C. to about 162° C. and the melting temperature of PGA is in the range of about 225° C. to about 230° C.

Figure 5A:
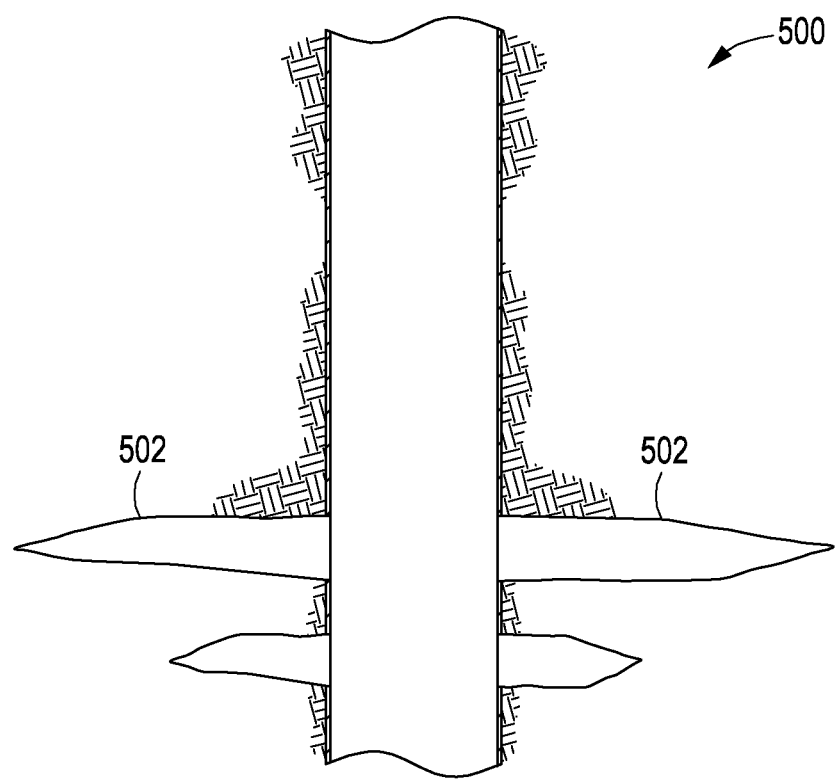
FIG. 5A is a schematic drawing of a wellbore comprising fractures or vugular water producing regions.
Figure 5B:
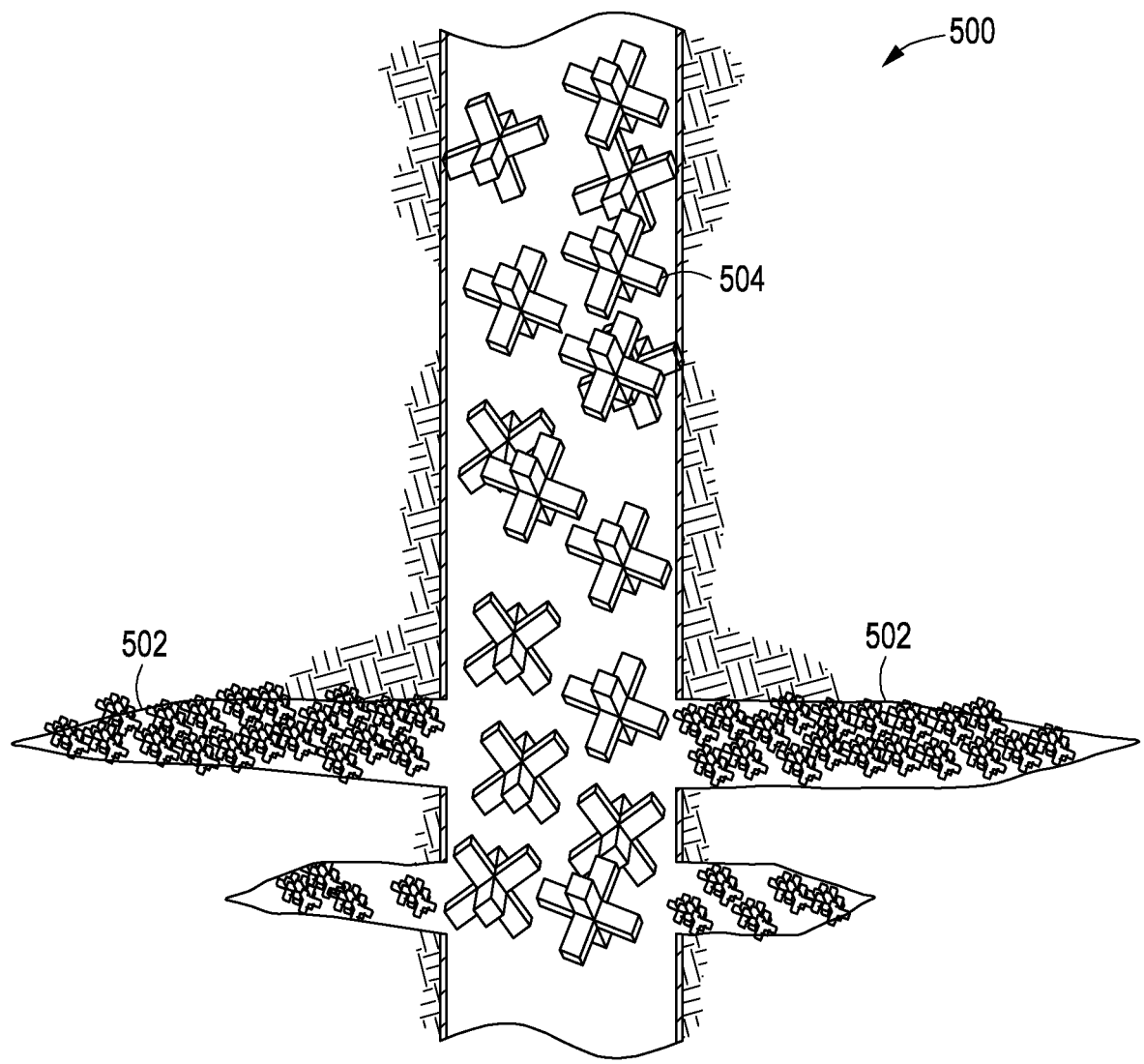
FIG. 5B is a schematic drawing of the wellbore of FIG. 5A comprising hydrolysable ester-based 3D engineered non-convex particles.

Referring now to FIG. 5A, illustrated is a wellbore 500 having multiple fractures or vugular water producing regions 502. Methods of the present disclosure involve injecting the NSCMs into wellbore 500 in a treatment fluid. As shown in FIG. 5B, the 3D acid precursors 504 forming a portion of the NSCMs aggregate within the vugular water producing regions 502. Therein, the 3D acid precursors dissolve and generate acid to gel the nanosilica particles included in the NSCMs to provide water shutoff.

The NSCMs may be included in a treatment fluid, wherein the treatment fluid is an aqueous fluid or an aqueous-miscible fluid. Suitable aqueous base fluids may include, but are not limited to, fresh water, saltwater (e.g., water containing one or more salts dissolved therein), brine (e.g., saturated salt water), seawater, produced water (e.g., water produced from a formation as a byproduct along with oil and gas), waste water (e.g., treated or untreated water adversely affected by anthropogenic influence), and any combination thereof. Suitable aqueous-miscible fluids may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof.

In some embodiments, the amount of 3DP acid precursors to nanosilicate particles is about 5 wt % to about 50 wt %, encompassing any value and subset therebetween, such as about 5 wt % to about 10 wt %, or about 10 wt % to about 20 wt %, or about 20 wt % to about 30 wt %, or about 30 wt % to about 40 wt %, or about 40 wt % to about 50 wt %.

Accordingly, the present disclosure advantageously comprises methods and compositions for providing water shut off within a wellbore.

Embodiments Disclosed Herein Include

Embodiment A: A water shut off composition comprising: alkaline nanosilica particles; and hydrolysable ester-based 3D engineered non-convex particles Embodiment B: A method comprising: introducing a water shut off composition into a water producing zone in a wellbore, the water shut off composition comprising alkaline nanosilica particles and hydrolysable ester-based 3D engineered non-convex particles; degrading the hydrolysable ester-based 3D engineered non-convex particles to release an acid within the water producing zone in the wellbore; and reacting the acid and the alkaline nanosilica particles, thereby forming a solid within the water producing zone in the wellbore.

Each of embodiments A and B may have one or more of the following additional elements in any combination:

Element 1: wherein the alkaline nanosilica particles are composed of a material selected from the group consisting of sodium silicate, silicon dioxide, and any combination thereof.

Element 2: wherein the alkaline nanosilica particles have an average particle diameter in the range of 2 nm to 150 nm.

Element 3: wherein the alkaline nanosilica particles have a specific surface area from 20 m² g⁻¹ to 1500 m² g⁻¹.

Element 4: wherein the hydrolysable ester-based 3D engineered non-convex particles are composed of polylactic acid.

Element 5: wherein the hydrolysable ester-based 3D engineered non-convex particles are composed of polyglycolic acid.

Element 6: wherein the hydrolysable ester-based 3D engineered non-convex particles are cross-shaped.

Element 7: wherein the hydrolysable ester-based 3D engineered non-convex particles are cross-shaped and have a length and width in the range of 0.05 inches to 0.3 inches.

Element 8: wherein the hydrolysable ester-based 3D engineered non-convex particles have a density in the range of 1.2 g/cm³ to 1.6 g/cm³.

Element 9: wherein the hydrolysable ester-based 3D engineered non-convex particles have a tensile strength in the range of 20 MPa to 60 MPa.

Element 10: wherein the hydrolysable ester-based 3D engineered non-convex particles have a melting temperature in the range of 150° C. to 230° C.

By way of non-limiting example, exemplary combinations applicable to A and B may include, but are not limited to: any one, more, or all of Elements 1-10 in any combination.

To facilitate a better understanding of the embodiments described herein, the following examples of various representative embodiments are given. In no way should the following examples be read to limit, or to define, the scope of the present disclosure.

EXAMPLE

In this Example, 100 ml of alkaline nanosilica colloidal solution was added in a beaker and 2 grams of PLA powder was added to the beaker to form an NSCM. The NSCM was mixed using a stirrer and was subjected to static aging at 300° F. for 24 hours. After 24 hours of static aging, the NSCM was converted into a solid (i.e., the nanosilica was gelled), thus demonstrating the capacity of the NSCM to provide water shut off.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. A method comprising:
   introducing a water shut off composition into a water producing zone in a wellbore, the water shut off composition comprising alkaline nanosilica particles and hydrolysable ester-based 3D engineered non-convex particles having a cross-shaped cross-section in each of the xy-plane, the yz-plane, and the xz-plane, and wherein the hydrolysable ester-based 3D engineered non-convex particles have a surface consisting of 6 protrusions;
   degrading the hydrolysable ester-based 3D engineered non-convex particles to release an acid within the water producing zone in the wellbore; and reacting the acid and the alkaline nanosilica particles, thereby forming a solid within the water producing zone in the wellbore.

2. The method of claim 1, wherein the alkaline nanosilica particles are composed of a material selected from the group consisting of sodium silicate, silicon dioxide, and any combination thereof.

3. The method of claim 1, wherein the alkaline nanosilica particles have an average particle diameter of 2 nm to 150 nm.

4. The method of claim 1, wherein the alkaline nanosilica particles have a specific surface area from 20 $m^2g^{-1}$ to 1500 $m_2g^{-1}$.

5. The method of claim 1, wherein the hydrolysable ester-based 3D engineered non-convex particles are composed of polylactic acid, polyglycolic acid, and any combination thereof.

6. The method of claim 1, wherein the hydrolysable ester-based 3D engineered non-convex particles have a length and width of 0.05 inches to 0.3 inches.

7. The method of claim 1, wherein the hydrolysable ester-based 3D engineered non-convex particles have a density of 1.2 $g/cm^3$ to 1.6 $g/cm^3$.

8. The method of claim 1, wherein the hydrolysable ester-based 3D engineered non-convex particles have a tensile strength of 20 MPa to 60 MPa.

9. The method of claim 1, wherein the hydrolysable ester-based 3D engineered non-convex particles have a melting temperature of 150° C. to 230° C.

\* \* \* \* \*